Oct. 2, 1928.

R. TOWNEND ET AL 1,685,970

DYNAMO-ELECTRIC MACHINE

Original Filed Aug. 12, 1922   3 Sheets-Sheet 1

WITNESSES:

INVENTOR
Robert Townend and
Jan Arthur Kuyser
ATTORNEY

Oct. 2, 1928.

R. TOWNEND ET AL 1,685,970

DYNAMO-ELECTRIC MACHINE

Original Filed Aug. 12, 1922    3 Sheets-Sheet 3

INVENTOR
Robert Townend and
Jan Arthur Kuyser

Patented Oct. 2, 1928.

1,685,970

UNITED STATES PATENT OFFICE.

ROBERT TOWNEND, OF CHORLTON-CUM-HARDY, AND JAN ARTHUR KUYSER, OF SALE, ENGLAND, ASSIGNORS TO WESTINGHOUSE ELECTRIC & MANUFACTURING COMPANY, A CORPORATION OF PENNSYLVANIA.

DYNAMO-ELECTRIC MACHINE.

Application filed August 12, 1922, Serial No. 581,347, and in Great Britain August 15, 1921. Renewed April 16, 1928.

This invention relates to dynamo-electric machines and particularly to alternators.

In cases where long distance high-tension transmission lines are employed it is necessary to bring the line pressure up to standard before applying any load and frequently a difficulty arises in charging the line to the correct voltage. There are some operating difficulties in using two or more alternators in parallel for charging the line and it is usual to employ a single alternator for this purpose. Under certain circumstances or conditions it may happen that the charging current gives rise to such a high wattless kilovolt ampere load that the voltage of the single alternator is brought considerably above normal even with zero or minimum excitation. This arises since a wattless component of output from the stator, with leading current, produces an armature reaction which has a magnetizing effect upon the magnetic circuit in the same manner as does the direct-current excitation in the field winding.

According to the present invention, for the purpose of charging up long distance high tension lines to the required voltage, the magnetic saturation of the stator or the rotor core of the alternator which is to supply the energy to the lines is temporarily increased above normal whereby the rise in voltage of the machine due to heavy charging currents is maintained at a relatively lower value. The increased saturation of the core may be produced by temporarily passing a current through a part or parts of the rotor winding in such a manner as to set up a reverse effect in a portion of the field system, thus counteracting in such portion the magnetizing action of the stator ampere turns on the one hand and on the other hand introducing effective saturation. Alternatively, an auxiliary winding may be provided on the stator or rotor core tending to neutralize a part of the field flux entering the stator core.

Figure 1:
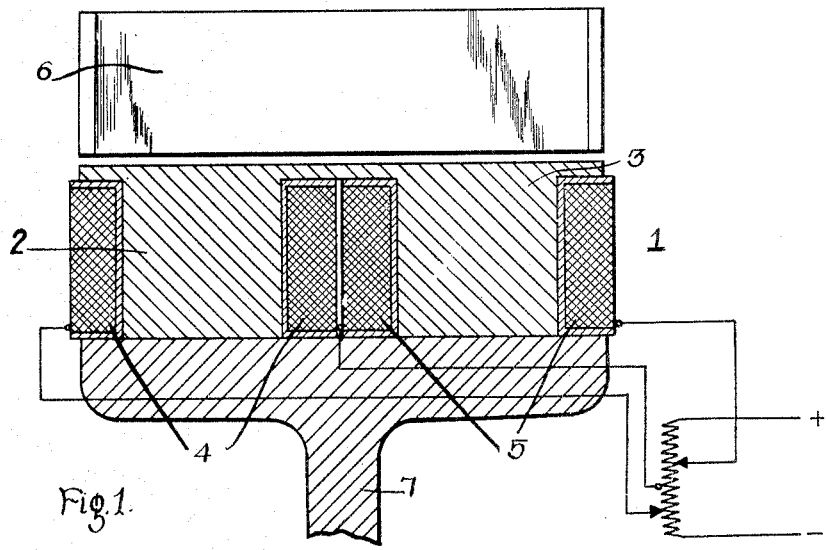
Figure 2:
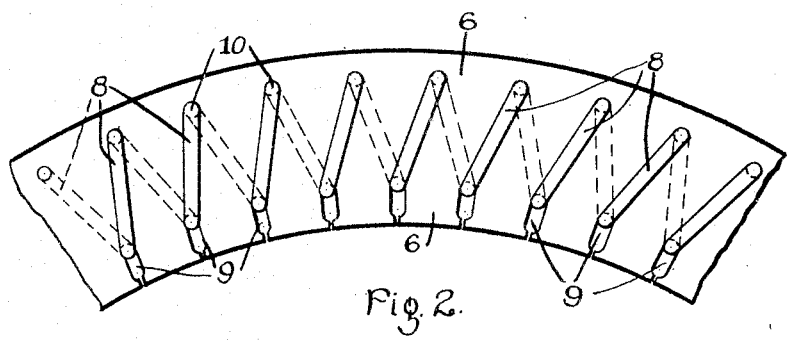
Figure 3:
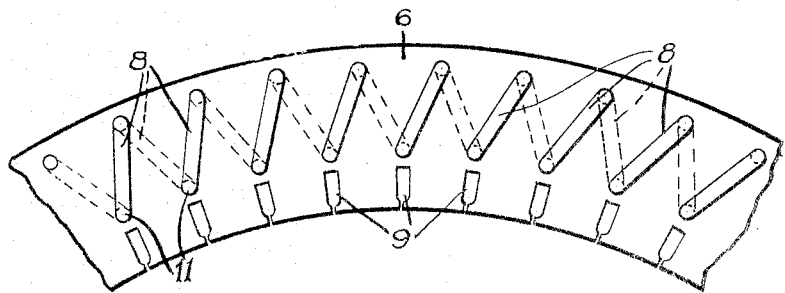
Figure 4:
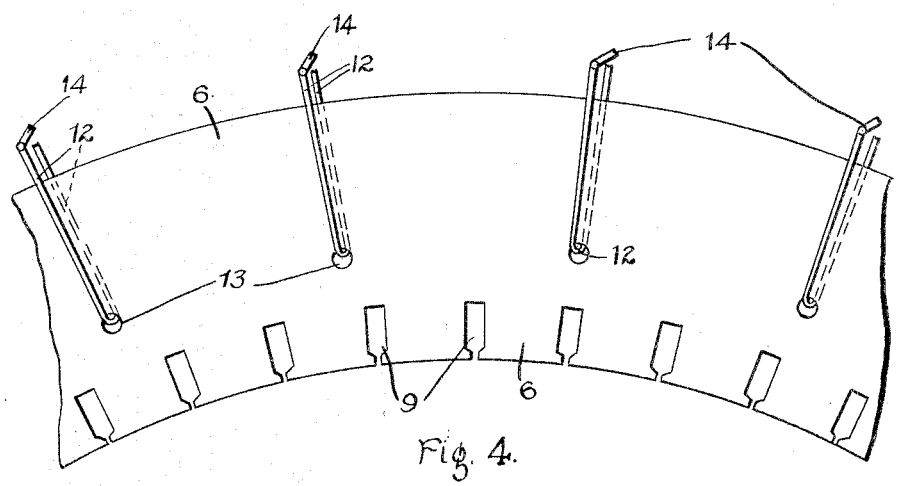
Figure 5:
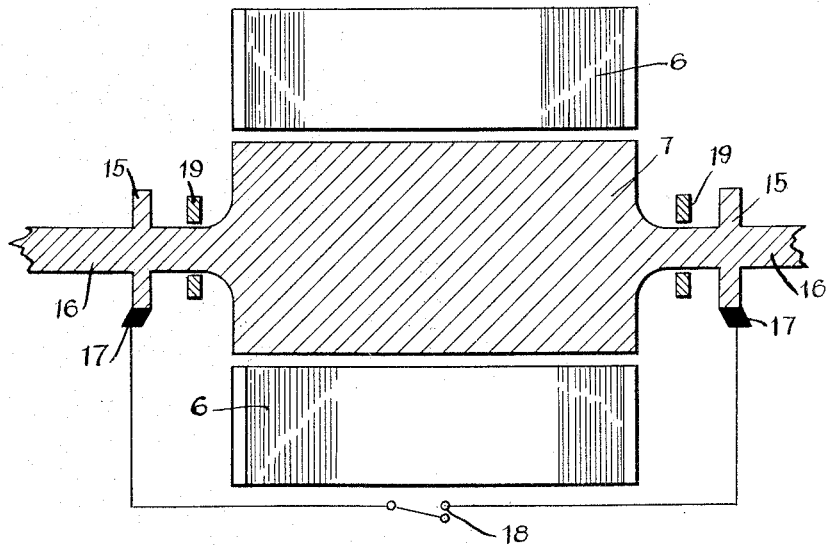
Figure 6:
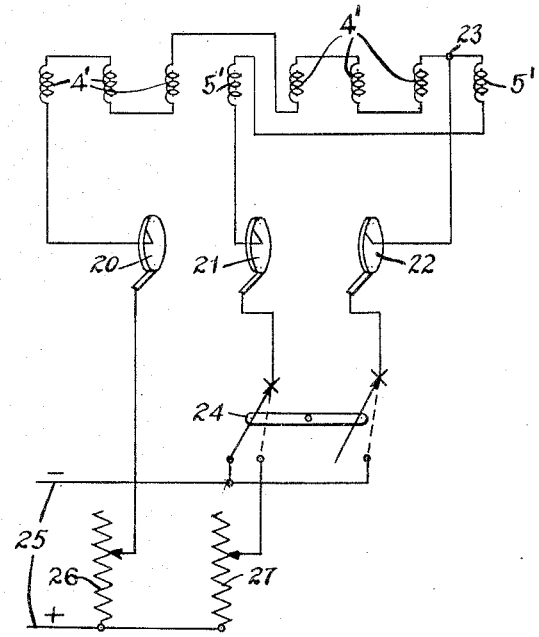

To enable the invention to be more clearly understood it will now be described with reference to the accompanying drawings in which Fig. 1 is a longitudinal section through part of an alternator illustrating one method of carrying out the invention, Fig. 2 is a diagrammatic view of the end of part of a stator core of an alternator having an auxiliary winding in accordance with the invention and Fig. 3 is a similar view of a modification. Fig. 4 is a diagrammatic view similar to Figs. 2 and 3 showing an alternative arrangement, Fig. 5 is a diagrammatic sectional view of an alternator showing a further method of carrying out the invention, and Fig. 6 is an electrical diagram illustrating a further modification.

According to the method illustrated by Fig. 1, each pole 1 of the rotor is divided into a plurality of parts, as indicated at 2 and 3, by a plane passing through the centre of the poles at right angles to the axis of the rotor. Each part 2 and 3 of the pole is provided with its own field winding as indicated at 4 and 5 and the separate parts 2 and 3 are arranged to be separately excited. During normal operating conditions these parts are excited in such manner that they act together as a single pole.

During the operating conditions which arise when the machine is to charge transmission lines, the excitation currents supplied to the windings 4 and 5 of the two pole parts are different from one another so that a component of flux circulates between one part of the pole and the other, thus changing the reluctance of the magnetic circuits and the shape of the saturation curve of the mahine. In this manner the flux which is effective in generating voltage in the conductors (not shown) in the stator core 6 is reduced, saturation occurring at a much lower stator voltage. In the extreme case the excitation currents supplied to one of the two parts of the poles may be reversed. When the line pressure attains its working value and after load has been put thereon and the other generator or generators, if any, are connected up the excitation of the two parts of the poles is made normal as described, that is to say, with equal current in each part. The stator 6 and the rotor spider 7 as well as other parts of the alternator may be of any usual construction. An alternator having the arrangement of field poles and working under the conditions above described will exhibit a smaller rise of stator voltage for a given stator leading current than a machine of ordinary construction.

Instead of dividing the field system as above described, a certain number of the poles may be temporarily reversed. This may conveniently be effected by the provision of an additional slip ring which is connected to a point in the field circuit in such manner that the current in certain of the windings may be temporarily reversed during the charging of the lines. For example, an alternator having eight poles with windings $4^1$ and $5^1$ arranged as shown in Fig. 6 may have the current in the windings $5^1$ reversed during the charging operation. This may be effected by the provision in addition to the two slip rings 20 and 21 of a third slip ring 22 connected to a point 23 in the connection between the pair of windings $4^1$ and $5^1$, the two windings $5^1$ being connected in series with the windings $4^1$ and in the order shown to the main slip ring 21. A double pole throw-over switch 24 may be arranged between the brushes of the slip rings 21 and 22 and the source 25 of excitation current in such manner that in one position of the switch all the field coils $4^1$ and $5^1$ are normally excited in series and in the proper sense whilst when the switch 24 is thrown over to the other contacts the current in the field windings $5^1$ is reversed. It will be observed that during the normal operation the slip ring 22 is disconnected from the supply. Rheostats 26 and 27 may be employed for varying the excitation as a whole or varying it in the field coils $5^1$ relative to the coils $4^1$ when the coils $5^1$ are excited in the reverse direction during the charging of transmission lines.

The method of carrying out the invention illustrated by Figs. 2 and 3 consists in partially saturating the stator core by means of an auxiliary winding supplied with direct current for the purpose of producing a flux circulating entirely around the stator core so that the cyclic magnetizing effect is exerted upon a stator core which is already partly saturated.

Referring to Fig. 2, 6 represents the stator core and 8 represents the auxiliary winding which as shown may be located partly in the slots 9 for the main stator winding and partly in slots or tunnels 10 provided at or near the outer periphery of the core, the winding being continuous and supplied with direct current during the charging up of transmission lines. The winding 8 is thus located behind the alternating-current windings and produces peripheral flux around the core without having to pass through polar air gaps. Part of the stator core is thus saturated by a relatively small number of ampere turns and a comparatively small amount of the stator core is available for carrying the alternating-current flux. It will be understood that the arrangement of the winding 8 is such that under normal operating conditions the voltage induced by the alternating-current flux in the different portions of the winding are equal, and opposite, giving a zero net alternating voltage.

According to the alternative arrangement illustrated by Fig. 3 the auxiliary winding 8 may be accommodated in slots or tunnels 11 specially provided in the stator core 6 and advantageously located behind the stator winding slots 9, the said winding also passing through slots 10 near the periphery of the stator core as already described in connection with Fig. 2. In stators where axial ventilation is employed the auxiliary winding 8 may be conveniently located in a certain number of the vent tunnels as well as in special tunnels as and where necessary. The inner tunnels 11 are arranged as near the stator windings as possible so that there is only a small amount of core material in a radial direction between the working slots and the part of the core which is surrounded by the auxiliary winding.

The change in the condition of the alternator during the charging up of transmission lines may be effected by varying the strength of the direct current in the auxiliary winding 8.

Referring now to Fig. 4 the method therein illustrated consists in rendering a portion of the stator core inaccessible to the alternating current flux during the charging up of transmission lines. Loops or coils 12 are passed through longitudinal slots or tunnels 13 in the stator core 6 behind the winding slots 9 and are arranged to be temporarily short circuited by switching devices diagrammatically represented at 14. With this arrangement the alternating current flux in that part of the stator core which is embraced by the loops or coils 12 is damped off or partly neutralized. The alternating current flux is thus largely confined to a relatively small part of the whole core and this part becomes saturated at a relatively low voltage.

It will be understood that when the transmission lines are charged up to the required voltage the switches 14 may be opened to remove the short circuit from the loops 12. It will be understood that several of the loops or coils 12 may be connected together in series and that such series connected groups may be short-circuited instead of individual loops or coils. The arrangement described in connection with Fig. 4 is more particularly applicable to alternators having a relatively small number of poles such as inturbo alternators. It will be understood, however, that the invention is not limited in this respect, such limitation not being a necessary one.

Referring now to Fig. 5, the saturation of the stator core may be effected according to a further method by the passage of a heavy current through the rotor core from end to end thereof thereby producing the equivalent of one turn encircling the stator core and producing therein a constant circumferential saturating flux. The path for the circumferential flux involves no appreciable air gaps in the stator core so that only a relatively small number of ampere turns is required to produce the saturation. The current may be passed through the rotor body in any convenient manner for example by means of slip rings 15 on the shaft 16 of the rotor and brushes 17 connected with a source of current indicated at 18. The slip rings for the field winding are diagrammatically indicated at 19.

The term "saturation", when employed substantively in the following claims is intended to refer to that flux-condition of the magnetic circuits wherein an increase in the magneto-motive force does not produce an appreciable increase in the flux.

It will be understood that various modifications in the arrangement and position of the auxiliary windings may be made without departing from the scope of the invention.

We claim as our invention:—

1. The method of preventing or restricting the rise of voltage in an alternator when employed for charging up electrical transmission lines, said alternator having a stator member and a rotor member, which consists in causing magnetic saturation to occur at lower values of magnetomotive force in one of said members during the charging operation.

2. The method of operating a synchronous dynamo-electric machine connected to an alternating-current transmission line of such length and voltage that the line charging current tends to produce excessive rise in voltage during light-load operation, which consists in causing the machine to require a larger total excitation to maintain a given voltage during light-load operation of the line than during normal load operation.

3. An alternator having salient field pole pieces which are divided, in a direction parallel to the longitudinal axis thereof, into a plurality of parts, each part having its own winding, and means for supplying the several windings with direct currents of different relative values or sense, whereby the magnetic flux may be unequally distributed between the respective parts of the pole pieces.

4. An alternator having salient field pole pieces which are divided, in a direction parallel to the longitudinal axis thereof, into a plurality of parts, each part having its own winding, the several windings having separate terminals.

5. The combination with a constant-voltage synchronous dynamo-electric machine comprising an armature member and a field member having a plurality of salient polar members, of means for supplying direct-current excitation to said polar members, a primary line circuit of such nature as to tend to produce excessively large magnetizing armature reaction within the machine, and means for producing stable operation of said machine independently of magnetizing armature reaction, said last-mentioned means including means for reversing the direction of excitation of certain of said polar members while maintaining the same direction of excitation in the other polar members.

6. The combination with a direct-current excited synchronous dynamo-electric machine and an alternating-current transmission line of such length and voltage that the line charging current tends to produce excessive magnetizing armature reaction accompanied by an excessive rise in voltage during light-load operation, of means whereby the machine may be caused to require more combined direct-current excitation and magnetizing armature reaction for forcing through the magnetic circuits of the machine the flux requisite to maintain a given voltage during the light-load operation of the line than during normal load operation.

7. The combination with an alternating-current dynamo-electric machine and a transmission line of such length and voltage that the line-charging current tends to produce excessive magnetizing armature reaction, of means whereby the machine may be caused to require more total excitation for forcing through the magnetic circuits of the machine the flux requisite to maintain a given voltage during operation with magnetizing armature reaction than during operation with demagnetizing armature reaction.

8. The method of utilizing a synchronous dynamo-electric machine to control the voltage of a condensive-reactance transmission line which consists in varying the unidirectional excitation of the field windings between maximum value and a predetermined minimum value and thereafter increasing the reluctance of the magnetic circuits thereof.

9. The method of utilizing a synchronous machine to control voltage of an alternating-current device having a condensive reactance which comprises increasing the magnetic reluctance of the machine during a period of magnetizing armature reaction while the machine is operatively connected to said device.

10. The method of operating a synchronous dynamo-electric machine connected to an alternating-current line which comprises increasing the reluctance of the magnetic circuit of said machine during the period when the alternating current flowing in the machine has a magnetizing armature reaction, whereby the range of stable operation is enlarged.

11. The method of preventing unstable operation of a synchronous alternating-current machine when operating with magnetizing armature currents which comprises varying the reluctance of the magnetic circuit of said machine.

12. The method of preventing unstable operation of a synchronous alternating-current machine when operating with magnetizing armature currents which comprises varying the reluctance of the magnetic circuit of said machine while the machine is in operation.

13. The method of preventing unstable operation of a synchronous alternating-current machine when operating with magnetizing armature currents which comprises decreasing the magnetizing effect of said currents.

14. The combination with an alternating-current transmission line of such length and voltage that the line charging current tends to produce excessive rise in voltage during light-load operation, of a synchrous dynamo-electric machine connected thereto and means for varying the shape of the saturation curve of said machine to produce stable operation of the machine when the line charging current is excessive.

15. The combination with a constant-voltage synchronous machine having an armature and a separately excited field member, said machine being operated, at times, with magnetizing armature currents and, at other times, with demagnetizing armature currents, and means for so changing the characteristics of the machine that it requires more combined magnetomotive force in the armature and in the field member, to produce the operating flux when the machine is operating with a magnetizing armature reaction than with a demagnetizing armature reaction, the magnetic circuit of said machine being so designed as to require a positive excitation of said field member under all conditions of operation, said means entailing no additional excitation of said field member under operation with demagnetizing armature reaction.

16. The combination with a constant-voltage synchronous machine comprising an armature and a field member having a pure direct-current excitation, said machine being operated, at times, with magnetizing armature currents and, at other times, with demagnetizing armature currents, and means for so changing the characteristics of the machine that it requires more resultant ampere-turns in the armature and in the field member, to produce the operating flux when the machine is operating with a magnetizing armature reaction than with a demagnetizing armature reaction, the magnetic circuit of said machine being so designed as to require a positive excitation of said field member under all conditions of operation.

17. The combination with a constant-voltage synchronous machine comprising an armature and a field member having a pure direct-current excitation, said machine being operated, at times, with magnetizing armature currents and, at other times, with demagnetizing armature currents, and means for so changing the operating conditions of the machine that the total magnetomotive force resulting from the combined effects of field excitation and armature reaction is smaller when the machine is operating with a demagnetizing armature reaction than with a magnetizing armature reaction, the voltage and speed being held substantially constant.

18. The combination of a constant-voltage synchronous machine having an armature and a direct-current excited field member, said machine being operated, at times, with magnetizing armature reaction and, at other times, with demagnetizing armature reaction, and means for so changing the operating conditions of the machine that the total exciting ampere-turns resulting from the combined effects of field excitation and armature reaction is smaller when the machine is operating with a demagnetizing armature reaction than with a magnetizing armature reaction, the voltage and speed being held substantialy constant, the magnetic circuit of said machine being so designed as to require a positive excitation of said field member under all conditions of operation.

19. The combination of a salient-pole constant-voltage synchronous machine comprising an armature and a field member having pure direct-current excitation, said machine being operated, at times, with magnetizing armature reaction and, at other times, with demagnetizing armature reaction, the magnetic circuits of said machine being designed to require relatively small field excitation under operation with demagnetizing armature reaction, and means for causing said machine to require a relatively larger total excitation during operation with magnetizing armature reaction to secure a positive direct-current excitation under all conditions of operation, said means comprising means for increasing the reluctance of the magnetic circuits.

20. The method of preventing or restricting the rise of voltage in an alternator when employed for charging up electrical transmission lines of such length and voltage that the line charging current tends to produce excessive rise in voltage during light-load operation which consists in altering the saturation curve of the machine during light-load operation of the line.

21. The method of operating an alternator which comprises temporarily saturating a portion of the magnetizable core portions thereof when the alternator is supplying a leading current, for the purpose of reducing voltage rise.

22. A synchronous dynamo-electric machine comprising an armature and a field member having a plurality of poles, said poles being divided in a direction parallel to the axis of the machine, and means for exciting the different longitudinal parts of said poles at different rates to produce changes in the effective reluctance of the magnetic circuit of said machine.

23. The method of operating a dynamo-electric machine connected to an alternating-current transmission line of such length and voltage that the line charging current tends to produce excessive rise in voltage during light-load operation, which consists in causing an increase in the effective reluctance of the magnetic circuits of said machine during light-load operation of the line.

24. A regulating system for an alternating-current synchronous generator which is adapted to supply a load of such a character that the excitation produced by the armature current is sufficient to cause the voltage of the generator to build up to an abnormal value, characterized by the fact that means are provided for varying the reluctance of the magnetic structure of the generator whereby the amount of flux produced by a given amount of armature current may be varied to regulate the voltage of said generator.

25. A regulating system for an alternating-current synchronous generator which is adapted to supply a load of such a character that the excitation produced by the armature current is sufficient to cause the generator voltage to build up to an abnormal value, characterized by the fact that means are provided for varying the saturation of a certain portion of the magnetic structure of the generator whereby the amount of flux produced by a given amount of armature current may be varied to regulate the voltage of said generator.

26. A regulating system for an alternating-current synchronous generator which is adapted to supply a load of such a character that the excitation produced by the armature current is sufficient to cause the generator voltage to build up to an abnormal value, characterized by the fact that means are provided for varying a magnetomotive force having such a direction as to set up a flux in the field structure of the generator in the same direction as the flux produced by the armature current in a certain portion of the field structure of said generator and a magnetomotive force of the opposite direction in another portion of the field structure, said means being arranged so that the magnetomotive forces may be varied with respect to each other.

27. A regulating system for an alternating-current synchronous generator which is adapted to supply current to a transmission line under varying conditions of load, characterized by the fact that means are provided whereby a magnetomotive force may be produced in one of the field poles of the generator so as to produce in said pole a flux in the same direction as the flux produced therein by the charging current supplied to the line, means are provided whereby a magnetomotive force may be produced in another one of the field poles of the generator so as to produce in said last mentioned pole a magnetomotive force equal to said first mentioned magnetomotive force but opposite in direction to the flux produced in said last mentioned pole by the charging current, and means are provided whereby the magnitude of each one of said opposing magnetomotive forces may be varied.

28. A regulating system for an alternating-current synchronous generator which is adapted to supply current to a transmission line under varying conditions of load, characterized by the fact that means are provided whereby a magnetomotive force may be produced in one of the field poles of the generator so as to produce in said pole a flux in the same direction as the flux produced therein by the charging current supplied to the line, means are provided whereby a magnetmotive force may be produced in another one of the field poles of the generator so as to produce in said last mentioned pole of a magnetomotive force equal to said first mentioned magnetomotive force but opposite in direction to the flux produced in said last mentioned pole by the charging current, and means are provided whereby the relative magnitudes of said magnetomotive forces may be varied.

29. A regulating system for an alternating-current synchronous generator which is adapted to supply current to a transmission line under varying conditions of load, characterized by the fact that means are provided whereby a magnetomotive force may be produced in one of the field poles of the generator so as to produce in said pole a flux in the same direction as the flux produced therein by the charging current supplied to the line, means are provided whereby a magnetomotive force may be produced in another one of the field poles of the generator so as to produce in said last mentioned pole a magnetomotive force equal to said first mentioned magnetomotive force but opposite in direction to the flux produced in said last mentioned pole by the charging current, and means are provided whereby the magnitude and direction of one of said magnetomotive forces may be varied with respect to the other magnetomotive force.

30. In a voltage-regulating system for an alternating-current synchronous generator which is adapted to supply a load of such a character that the excitation produced by the armature current is sufficient to cause the voltage of the generator to build up to an abnormal value, the combination of a plurality of windings on the field structure of said generator connected and arranged so that the reluctance of the magnetic structure of the generator may be controlled by varying the current through the windings with substantially no additional flux being produced in the magnetic structure by said windings, and means for varying the current through each one of said windings.

31. In a voltage-regulating system for an alternating-current synchronous generator which is adapted to supply a load of such a character that the excitation produced by the armature current is sufficient to cause the voltage of the generator to build up to an abnormal value, the combination of a winding on one of the poles of said generator arranged so that the current through said winding produces a flux which is in the same direction as the flux produced in said pole by the armature current, a winding on another one of the poles of said generator arranged so that the current through said last mentioned winding tends to produce a flux in said other one of said poles in opposition to the flux produced by the armature current, and means for controlling the currents through said windings so that magnetomotive forces produced by the currents through said windings are equal.

In testimony whereof we have hereunto subscribed our names this twenty-fifth day of July, 1922.

ROBERT TOWNEND.
JAN ARTHUR KUYSER.